Nov. 18, 1930.                     B. HAAK                     1,782,038
CONVERSION OF SALTS INTO GLOBULAR OR SIMILAR SHAPED BODIES
Filed Nov. 19, 1928
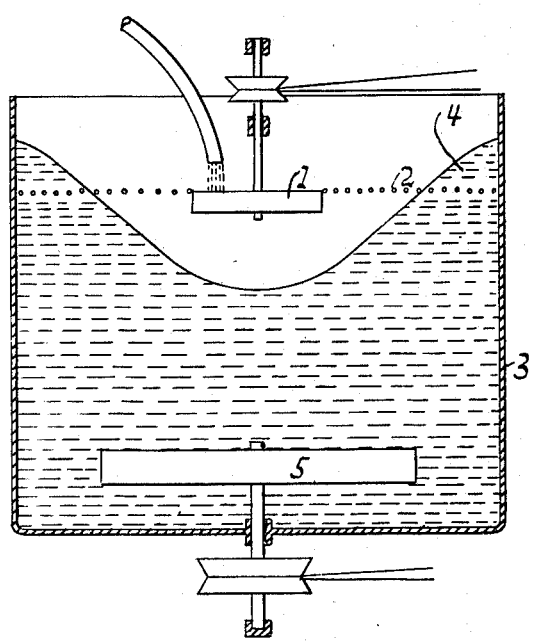
INVENTOR
Bodo Haak
BY
Hauff&Warland
ATTORNEYS Patented Nov. 18, 1930

1,782,038

UNITED STATES PATENT OFFICE

BODO HAAK, OF NEUROESSEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CONVERSION OF SALTS INTO GLOBULAR OR SIMILAR SHAPED BODIES

Application filed November 19, 1928, Serial No. 320,445, and in Germany December 13, 1927.

The present invention relates to the conversion of salts and more especially fertilizers and the like into globular or similar shaped bodies.

Processes for the conversion of salts, and more especially fertilizers and the like into small globular or spherically shaped bodies and the like have already been described in the literature. These processes consist substantially in allowing the material in the fused state to drop into cooled liquids in which they are insoluble. In so doing, it is necessary that the individual drops of the melt should be deprived, during their passage through the cooling liquid, of so much of their heat that, on reaching the bottom of the cooling vessel, they are so solid that they do not stick together and are not deformed by the conveying device. This effect has hitherto been obtained, for example by the use of a very deep cooling vessel and of a cooling liquid of the greatest possible density and low temperature.

I have now found that the same result is attained in a much simpler manner by reducing the downward velocity of the drops in their fall through the cooling liquid, and this is accomplished by setting the liquid in motion, preferably in circulation about the vertical axis of the vessel in which said liquid is contained. According to this manner of working, by suitably adjusting the rate of flow of the cooling liquid, the individual drops of the melt are kept in suspension in the liquid for a considerable time, and are thus enabled to part with their heat completely and to become solid without the necessity of any extensive cooling of the cooling liquid. Particular good results can be obtained by employing for the said purpose cooling liquids which contain finely divided solid substances, for example chalk, gypsum and the like. The result of this manner of working is that the drops falling into and solidifying in the cooling liquid become coated immediately with a fine layer of the added substance, so that the solidified drops are strictly prevented from adhering on coming into mutual contact. Moreover, it is also possible according to this invention to drop the melt into the liquid from a plurality of adjacently disposed nozzles, and still to obtain a very uniform product.

The layer coating the globules also prevents more or less completely the accession of atmospheric moisture, so that the keeping properties are substantially improved, especially in the case of hygroscopic material, which effect may be further increased by an addition to the cooling liquid of a difficultly water-soluble oil or wax, dissolving in the liquid such as paraffin oil or wax or a similar substance, which remain as a coating on the granules of salts after the evaporation of the adhering cooling liquid or which form a protective film on the granules by reaction with the salts.

An advantageous method of carrying out the process according to my invention consists in spurting the melt from a rotating disc into the paraboloidal depression in the surface of a suitable cooling medium, which is formed by the rotation of the said cooling medium about its vertical axis.

An apparatus suitable for the said purpose will be further illustrated with reference to the accompanying diagram which represents one modification thereof.

The melt is poured onto the rotating disc (1) whereby the particles of the melt (2) are thrown off from the rotating disc (1) to the walls of the vessel (3) through the cooled liquid (4) the level of which is higher than that of the rotating disc (1) because it is kept in intense rotation by means of the stirrer (5). The particles are thus cooled immediately. The rotation of the liquid may be brought about in any suitable manner, as for example as shewn in the diagram by means of a mechanical stirrer (5), or by pumping the liquid round by means of tangential inlets and outlets in the container. The disc (1) is shown in the drawing as being arranged horizontally, but it may also have a slight incline and be rotated around an axis slightly inclined against the vertical.

The following examples will further illustrate the nature of the said invention which, however, is not limited thereto. The parts are by weight.

Example 1

A calcium nitrate melt containing about 12.5 per cent of water is allowed to drop into carbon tetrachlorid. The cooling liquid is contained in a circular vessel in a depth of half a meter or even less and is set into rotation around the vertical axis of the vessel by means of a stirring device. Notwithstanding the shallow depth of the cooling liquid, the drops reach the bottom in such solid condition, owing to the long spiral course resulting from the movement of the liquid, that they will no longer stick together or undergo deformation.

Example 2

A calcium nitrate melt, with about 12.5 per cent of moisture, is allowed to drop into cooled carbon tetrachlorid to which 3 parts of finely ground calcium carbonate have been added per 1000 parts of cooling liquid. The added substance is kept in suspension by actively agitating the liquid. A uniform, globular product is obtained which is well suited to serve as a fertilizer.

Example 3

A calcium nitrate melt, with about 12.5 per cent of moisture, is allowed to drop into cooled carbon tetrachlorid to which 3 parts of finely ground calcium carbonate have been added per 1000 parts of cooling liquid and moreover 5 parts of paraffin oil. By addition of paraffin the hygroscopicity of the globular product obtained is decreased and the formation of dust in handling the product is avoided.

What I claim is:

1. The process for the conversion of salts into globular or similar shaped bodies, which comprises dropping the fused salt into a cool liquid not dissolving said salt and set into rotation around a vertical axis within the liquid.

2. The process for the conversion of salts into globular or similar shaped bodies, which comprises excentrically dropping the fused salt into a cool liquid not dissolving said salt and set into rotation around a vertical axis within the liquid.

3. The process for the conversion of salts into globular or similar shaped bodies, which comprises excentrically dropping the fused salt into a cool liquid not dissolving said salt, set in continuous rotation around a vertical axis within the liquid, and containing a finely divided solid substance.

4. The process for the conversion of salts into globular or similar shaped bodies, which comprises dropping the fused salt into a cool liquid not dissolving said salt, set in continuous rotation around a vertical axis within the liquid, and containing a finely divided solid substance, and a water insoluble organic material dissolved in the said liquid.

5. The process for the conversion of salts into globular or similar shaped bodies, which comprises dropping a fused salt insoluble in carbon tetrachlorid, set into rotation around a vertical axis within the liquid.

6. The process for the conversion of salts into globular or similar shaped bodies, which comprises dropping a fused salt insoluble in carbon tetrachlorid, set into rotation around a vertical axis within the liquid, and containing a finely divided solid substance.

7. The process for the conversion of salts into globular or similar shaped bodies, which comprises dropping a fused salt insoluble in carbon tetrachlorid, set into rotation around a vertical axis within the liquid, and containing a finely divided solid substance, and a water insoluble organic material dissolved in the carbon tetrachloride.

8. The process for the conversion of salts into globular or similar shaped bodies, which comprises dropping fused calcium nitrate into cool carbon tetrachlorid, set into rotation around a vertical axis within the liquid.

9. The process for the conversion of salts into globular or similar shaped bodies, which comprises dropping fused calcium nitrate into cool carbon tetrachlorid, containing finely divided calcium carbonate, and set into rotation around a vertical axis within the liquid.

10. The process for the conversion of salts into globular or similar shaped bodies, which comprises dropping fused calcium nitrate into cool carbon tetrachlorid, containing finely divided calcium carbonate and paraffin oil, and set into rotation around a vertical axis within the liquid.

11. An apparatus suitable for the conversion of salts into globular or similar shaped bodies, which comprises a vessel, means for intensely rotating a liquid contained in the said vessel around the vertical axis thereof, a substantially horizontal disc, arranged in the upper part of the said vessel at such a distance from the bottom thereof, that the disc does not touch the liquid when the latter is set in an intense rotation, and means for rotation, and means for rotating said disc around its substantially vertical axis.

12. An apparatus suitable for the conversion of salts into globular or similar shaped bodies, which comprises a vessel, a stirrer near the bottom of the said vessel for intensely rotating a liquid contained in the said vessel around the vertical axis thereof, a substantially horizontal disc, arranged in the upper part of the said vessel at such a distance from the bottom thereof, that the disc does not touch the liquid when the latter is set in an intense rotation, and means for rotating said disc around its substantially vertical axis.

In testimony whereof I have hereunto set my hand.

BODO HAAK.